(12) United States Patent
Furukawa et al.

(10) Patent No.: US 8,693,366 B2
(45) Date of Patent: Apr. 8, 2014

(54) COMMUNICATION SYSTEM, A SLAVE NODE, A ROUTE MAKING METHOD AND A PROGRAM

(75) Inventors: Hiroshi Furukawa, Fukuoka (JP); Guangri Jin, JiLin Province (CN)

(73) Assignee: Kyushu University, National University Corporation, Fukuoka (JP)

( * ) Notice: Subject to any disclaimer, the term of this patent is extended or adjusted under 35 U.S.C. 154(b) by 35 days.

(21) Appl. No.: 13/580,816

(22) PCT Filed: Feb. 22, 2011

(86) PCT No.: PCT/JP2011/053845
§ 371 (c)(1),
(2), (4) Date: Aug. 29, 2012

(87) PCT Pub. No.: WO2011/105371
PCT Pub. Date: Sep. 1, 2011

(65) Prior Publication Data
US 2012/0320781 A1    Dec. 20, 2012

(30) Foreign Application Priority Data

Feb. 23, 2010   (JP) ................................. 2010-037141
Feb. 25, 2010   (JP) ................................. 2010-040271

(51) Int. Cl.
*G01R 31/08*   (2006.01)

(52) U.S. Cl.
USPC .......................................... 370/252; 370/351

(58) Field of Classification Search
None
See application file for complete search history.

(56) References Cited

U.S. PATENT DOCUMENTS

| | | | |
|---|---|---|---|
| 7,664,066 B2 * | 2/2010 | Kawaguchi et al. | 370/328 |
| 7,948,966 B2 * | 5/2011 | Hughes et al. | 370/351 |
| 7,978,632 B2 * | 7/2011 | Aguirre et al. | 370/255 |
| 8,098,658 B1 * | 1/2012 | Ranganathan et al. | 370/389 |
| 2005/0197127 A1 | 9/2005 | Nakasaku et al. | |
| 2007/0076738 A1 * | 4/2007 | Ludwig et al. | 370/431 |
| 2011/0141932 A1 * | 6/2011 | Iwao et al. | 370/252 |

FOREIGN PATENT DOCUMENTS

| | | |
|---|---|---|
| JP | 2005252781 | 9/2005 |
| JP | 3928636 | 6/2007 |
| JP | 4227737 | 2/2009 |
| JP | 2009-130517 | 6/2009 |
| JP | 4389929 | 12/2009 |

OTHER PUBLICATIONS

International Search Report dated Apr. 5, 2011.

* cited by examiner

*Primary Examiner* — Kibrom T Hailu
(74) *Attorney, Agent, or Firm* — Rankin, Hill & Clark LLP

(57) ABSTRACT

Provided are a communication system and the like capable of making a stable relay route even when a propagation channel is fluctuated by the fluctuation of RSSI. For making a tree-type communication route whose root is a core node, each slave node, after the reception of the latest reset routing packet from a node, judges if the transmission source node should be the parent of the tree-type structure based on the sequential average of the reception power of n routing packets received from the same transmission source node. As the reception power is log-normally distributed in general, an asymptotically stable relay route can be obtained, especially by using the sequential average.

7 Claims, 8 Drawing Sheets

COMMUNICATION SYSTEM, A SLAVE NODE, A ROUTE MAKING METHOD AND A PROGRAM

TECHNICAL FIELD

The present invention relates to a communication system, a slave node, a route making method and a program, and particularly relates to a communication system including a core node that connects to a backbone network and a plurality of slave nodes that connect to the core node with wireless communication directly or via another slave node, and the like.

BACKGROUND ART

As a form of new generation broad band mobile device, a cellular system where a group of narrow cell base stations are connected by wireless multihop relay is studied. In this system, some base stations called core nodes are connected to the backbone network by lines and other nodes are connected to the backbone network by wireless multihop relay via a core node.

Such a wireless relay network is usually called a wireless backhaul. The stable operation and the enlargement depend of the wireless backhaul on the realization of an excellent wireless multihop relay protocol. The routing protocol of a wireless backhaul is characterized in its metric and algorithm and algorithm varies depending on the definition of the metric. The metrics proposed so far includes hop count and the quality of wireless link between nodes, for example. That is, ETX (Expected Transmission Count) metric, RTT (Per-hop Round Trip Time) metric, WCETT (Weighted Cumulative Expected Transmission) metric, and so on. The commonly used conventional algorithms include Bellman-Ford algorithm, Dijkstra algorithm, and so on.

In addition, the present inventors proposed routing methods (referred to as "conventional minimum path loss routing" below) where path loss is adopted as the metric (Patent Documents 1 through 3 and Non-Patent Document 1.) The conventional minimum path loss routing makes a relay route such that the path loss from each slave node to a core node is minimum using Bellman-Ford algorithm by calculating the path loss based on the reception power between nodes (RSSI, Received Signal Strength Indicator) as the metric. Referring to FIG. 8, the conventional minimum path loss routing will be described concretely. FIG. 8 shows a flowchart indicating the behavior of the slave node in the conventional path loss routing. When a core node broadcasts a routing packet of metric 0 and a slave node receives the routing packet (step STSP1), the path loss is calculated based on the RSSI at reception and a new metric is calculated by adding the path loss and an accumulated metric (indicating the sum of path losses from the transmission source node of the received packet to the core node) included in the received packet (step STSP2.) If this new metric is smaller than an accumulated metric held by the own node (step STSP3), a route is updated and the routing packet including the new metric is broadcasted to neighbor nodes (step STSP4.) In the step STSP3, if the new metric is not smaller, the route will not be updated. By repeating the processing above, a route is made. And if a predetermined time is passed without receiving any routing packet (step STSP5), a node registration packet is transmitted (step STSP6), and the processing is quitted. Finally, a tree-type route where a core node plays a central role is made. Because the path loss is adopted as a metric in the minimum path loss routing, the made relay route as a whole is tolerant of interference. Thus, the excellent and highly efficient transmission can be expected.

In addition, many methods are already proposed as a routing protocol for wireless multihop relay. And the standardization of ad-hoc-type wireless backhaul is being promoted by MANET (Mobile Ad-hoc Networks) WG of IETF (Internet Engineering Task Force.)

SUMMARY OF THE INVENTION

Problem to be Solved by the Invention

However, if a hop count is adopted as the metric, a link between nodes far apart is used in the route, leading to less stability of the route.

Besides, the route made by the conventional minimum path loss routing is unstable at the fluctuation of propagation channel. In the Non-Patent Document 1, the efficiency of the minimum path loss routing is evaluated by computer simulation without consideration on the fluctuation of propagation channel. But in the actual environment, RSSI can fluctuate by people's traffic (line a in FIG. 2.) According to the conventional minimum path loss routing, the metric is calculated based only on the RSSI of the received routing packet so that the metric used for route making can fluctuate at the fluctuation of RSSI, resulting in the fluctuation of the route depending on the execution time, which means an unstable route.

The routing protocols for a wireless multihop relay proposed so far are not equipped with the feature to make a stable route at the fluctuation of propagation channel. Thus, the route made by these methods are just a most appropriate route at a specified time and a frequent restructuring of the route is necessary at the fluctuation of propagation channel, resulting in much load on the network.

In more detail, these routing protocols can be classified into an on-demand-type and a static type.

According to a routing protocol of on-demand-type, routing processing is executed every time a transmission demand is occurred and the made route exists for a certain amount of time to live (TTL.) When a communication finishes, the route is deleted. A routing protocol of on-demand-type is adequate for a highly mobile ad-hoc network because it can quickly correspond to the change of network topology though the load of routing processing is heavy.

On the other hand, according to a routing protocol of static type, a route is made at power-on of the system to construct a network and the route is kept to start the service. A routing protocol of static type is adequate for a wireless backhaul, because each base station is fixed.

Each base station is fixed in a wireless backhaul while a propagation channel can fluctuate at the influence of fading occurred by people's traffic and so on. However, in the routing protocol of the conventional static type, the algorithm is not designed taking into consideration of the fluctuation of propagation just as the conventional minimum path loss routing. Because the temporal fluctuation of propagation channel is totally neglected, different relay routes are made depending on the execution time of routing even with the same node placement. Besides, the fluctuation of throughput is also reported from the inspection, using an original testbed, of temporal route fluctuation based on the fluctuation of propagation channel in a wireless backhaul.

When using a routing of static type, if routing is executed referring only to the propagation channel situation at power-on of the system, the system performance by the route cannot be guaranteed because of the fluctuation of the propagation channel, and the relay route can be broken at worst.

It is, therefore, an object of the present invention to provide a communication system and the like capable of making a stable relay route even when a propagation channel is fluctuated by the fluctuation of RSSI, and the like.

Means for Solving the Problem

A first aspect in accordance with the present invention provides a communication system, comprising a core node that connects to a backbone network, and a plurality of slave nodes that connect to the core node with wireless communication directly or via another slave node, wherein the core node transmits, to one of the slave nodes, a reset routing packet for instructing the slave node to initialize a communication route from the core node to the slave node itself, and afterwards, a plurality of normal routing packets for instructing the slave node to construct a communication route from the core node to the slave node itself, the slave node includes an own route evaluation value storing unit that stores an own route evaluation value which is an evaluation value of a communication route from the core node to the slave node itself, an uplink forwarding target storing unit that stores an uplink forwarding target information which shows an uplink forwarding target node which is a first node on a communication route from the slave node itself to the core node, and a route making processing unit that decides a communication route from the core node to the slave node itself, when receiving the reset routing packet and n (n is a counting number) of the normal routing packets from a single transmission source node, after judging whether to replace the uplink forwarding target node by the transmission source node the route making processing unit includes a reception power evaluation value calculating unit that calculates a reception power evaluation value which is an evaluation value of reception power between the slave node itself and the transmission source node, based on reception power of the n-th normal routing packet received, a new accumulated route evaluation value calculating unit that calculates a new accumulated route evaluation value which is an evaluation value of a communication route that the n-th normal routing packet received has gone through, based on an evaluation value of a relay route from the core node to the transmission source node and on the reception power evaluation value, and a route making processing unit that, if the new accumulated route evaluation value is smaller than the own route evaluation value, makes the uplink forwarding target storing unit store a transmission source node of the normal routing packet as a new uplink forwarding target node, and makes the own route evaluation value storing unit store the accumulated route evaluation value as a new own route evaluation value for a route making processing, and the reception power evaluation unit, if n equals to or is larger than two, calculates a reception power evaluation value which is an evaluation value of a reception power between the slave node itself and the transmission source node, based not only on a reception power of the n-th normal routing packet received but also on a part of or all of reception power of the reset routing packet and/or the normal routing packet separately received.

A second aspect in accordance with the present invention provides the communication system of the first aspect, wherein the reception power evaluation value calculating unit calculates a reception power evaluation value $A_n$ which is an evaluation value of a reception power $R_n$ of the n-th normal routing packet received, setting a default value a constant or a reception power of the reset routing packet, based on an equation (eq1) with $\alpha_n$ and $\beta_n$ ($\alpha_n$ and $\beta_n$ are functions of n, $\alpha_n$ is not identically 0).

A third aspect in accordance with the present invention provides the communication system of the second aspect wherein in the equation (eq1), $A_1 = R_1$; and if n equals to or is larger than two, $\alpha_n = (n-1)/n$ and $\beta_n = 1/n$.

A fourth aspect in accordance with the present invention provides the communication system of the second aspect wherein in the equation (eq1), $\alpha_n$ and/or $\beta_n$ is a constant.

A fifth aspect in accordance with the present invention provides a slave node that connects to a core node with wireless communication directly or via another slave node, comprising an own route evaluation value storing unit that stores an own route evaluation value which is an evaluation value of a communication route from the core node to the slave node itself, an uplink forwarding target storing unit that stores an uplink forwarding target information which shows an uplink forwarding target node which is a first node on a communication route from the slave node itself to the core node, and a route making processing unit that decides a communication route from the core node to the slave node itself, when receiving a reset routing packet for instructing the slave node to initialize a communication route from the core node to the slave node itself, from the core node, and n (n is a counting number) of normal routing packets for instructing the slave node to construct a communication route from the core node to the slave node itself, from a single transmission source node, after judging whether to replace the uplink forwarding target node by the transmission source node, wherein the route making processing unit includes a reception power evaluation value calculating unit that calculates a reception power evaluation value $A_n$ which is an evaluation value of a reception power $R_n$ of an n-th normal routing packet received, by calculating a sequential average of a reception power of the reset routing packet and n of received normal routing packets or by calculating a sequential average of received normal routing packets a new accumulated route evaluation value calculating unit that calculates a new accumulated route evaluation value which is an evaluation value of a communication route that the n-th normal routing packet received has gone through, based on an evaluation value of a relay route from the core node to the transmission source node and on the reception power evaluation value, and a route making processing unit that, if the new accumulated route evaluation value is smaller than the own route evaluation value, makes the uplink forwarding target storing unit store a transmission source node of the normal routing packet as a new uplink forwarding target node, and makes the own route evaluation value storing unit store the accumulated route evaluation value as a new own route evaluation value for a route making processing.

A sixth aspect in accordance with the present invention provides a route making method for a communication system including a core node that connects to a backbone network and a plurality of slave nodes that connect to the core node with wireless communication directly or via another slave node, wherein each of the slave nodes includes an own route evaluation value storing unit that stores an own route evaluation value which is an evaluation value of a communication route from the core node to the slave node itself, an uplink forwarding target storing unit that stores an uplink forwarding target information which shows an uplink forwarding target node which is a first node on a communication route from the slave node itself to the core node, and a neighbor node storing unit that stores a combination of a node which is capable of transmit or receive a packet with the slave node itself and a reception power evaluation value which is an evaluation value of a reception power of packet transmission with the node, the method comprising initializing including transmitting, by the core node, a reset routing packet for instructing the slave node to initialize a communication route from the core node to the slave node itself, and, by an initialization unit of the slave node which received the reset routing packet, judging whether the slave node has received the reset routing packet for the first time, and if received for the first time, transmitting the same reset routing packet to nodes stored in the neighbor node storing unit, deleting information stored in the neighbor node storing unit, and setting the own route evaluation value a maximum value, and route making including transmitting, by the core node, a plurality of normal routing packets for instructing the slave node to construct a communication route from the core node to the slave node itself with their transmission order specified and by a reception power evaluation value calculating unit in the slave node which received the normal routing packet, if a transmission source node of the received normal routing packet is not stored in the neighbor node storing unit, calculating a reception power evaluation value which is an evaluation value of a reception power between the slave node itself and the transmission source node based on a reception power of the normal routing packet and making the neighbor node storing unit store a combination of the transmission source node and the reception power evaluation value, if a transmission source node of the received normal routing packet is stored in the neighbor node storing unit, calculating a new reception power evaluation value not only based on a reception power of the normal routing packet but also on the reception power evaluation value stored in the neighbor node storing unit, and making the neighbor node storing unit store a combination of the transmission source node and a new reception power evaluation value, judging, by a new round processing unit, whether the received normal routing packet is the normal routing packet received for the first time or not based on the transmission order, and setting the new own route evaluation value a maximum value if received for the first time, calculating, by a new accumulated route evaluation value calculating unit, a new accumulated route evaluation value which is an evaluation value of a communication route that the normal routing packet has gone through, based on an evaluation value of a relay route from the core node to the transmission source node and on the reception power evaluation value, and if the new accumulated route evaluation value is smaller than the own route evaluation value, making, by a route making processing unit, the uplink forwarding target storing unit store a transmission source node of the normal routing packet as a new uplink forwarding target node, making the own route evaluation value storing unit store the accumulated route evaluation value as a new own route evaluation value for a route making processing, and deciding a communication route from the core node to the slave node itself by transmitting a new own route evaluation value to a node stored in the neighbor node storing unit.

A seventh aspect in accordance with the present invention provides a program capable of causing a computer to function as a slave node of the fifth aspect.

The reception power evaluation value calculating unit may calculate a reception power evaluation power using the equation (eq1) wherein A0 is a reception power R0 of a reset routing packet, $\alpha_n=n/(n+1)$ and $\beta_n=1/(n+1)$ for a counting number n. In particular, in the sixth aspect of the present invention, the initialization unit of the slave node which received the reset routing packet may, after deleting information stored in the neighbor node storing unit, set the initial value of a reception power evaluation value a reception power of the reset routing packet and make the neighbor node storing unit store a combination of the transmission source node of the reset routing packet and the initial value of a reception power evaluation value. Additionally, another aspect of the present invention is a computer-readable storage medium (steadily) having the program of the seventh aspect.

[Equation 1]

$$A_n = \alpha_n \times A_{n-1} + \beta_n \times R_N. \quad (eq1)$$

Here, functions $\alpha_n$ and $\beta_n$ may satisfy, for example, $\alpha_n + \beta_n$ equals to or smaller than 1 (in particular, $\alpha_n + \beta_n = 1$.) Further, the reception power evaluation value $A_n$ can be more stably obtained when such functions $\alpha_n$ and $\beta_n$ are selected that $\alpha_n \to 1$ and $\beta_n \to 0$ for n->infinity.

Effect of the Invention

According to the present invention, unlike the conventional minimum path loss routing method, a route is made not only based on RSSI of the normal routing packet which is a cue to start each route making processing but also on RSSI of other normal routing packets received after the reception of the latest reset routing packet. Therefore, even if, after reset routing packet is received, the place of each node is fixed and not moved while RSSI is fluctuated, it is possible to make a stable relay route.

In addition, according to the second and the fifth aspect of the present invention, the reception power evaluation value $A_n$ of the n-th (n is a counting number equal to or larger than 2) normal routing packet received after receiving a reset routing packet, not only based on the reception power $R_n$ of this normal routing packet but also on a reception power evaluation value $A_{n-1}$. Then, it is made possible to reduce the number of variables to be stored in a slave node and calculation processing, leading to easier realization of a slave node. In particular, in a route of a wireless backhaul, RSSI is known to be log-normally distributed in general. Therefore, as in the third aspect of the present invention, by calculating sequential averages to obtain $A_n$, a stable relay route can be asymptotically obtained. Further, as in the fourth aspect of the present invention, by setting a function $\alpha_n$ and/or $\beta_n$ a constant, the fluctuation of RSSI can be relieved.

MODES FOR CARRYING OUT THE INVENTION

Below, referring to figures, the embodiment of the present invention is described. However, the present invention is not restricted to this embodiment.

Figure 1:
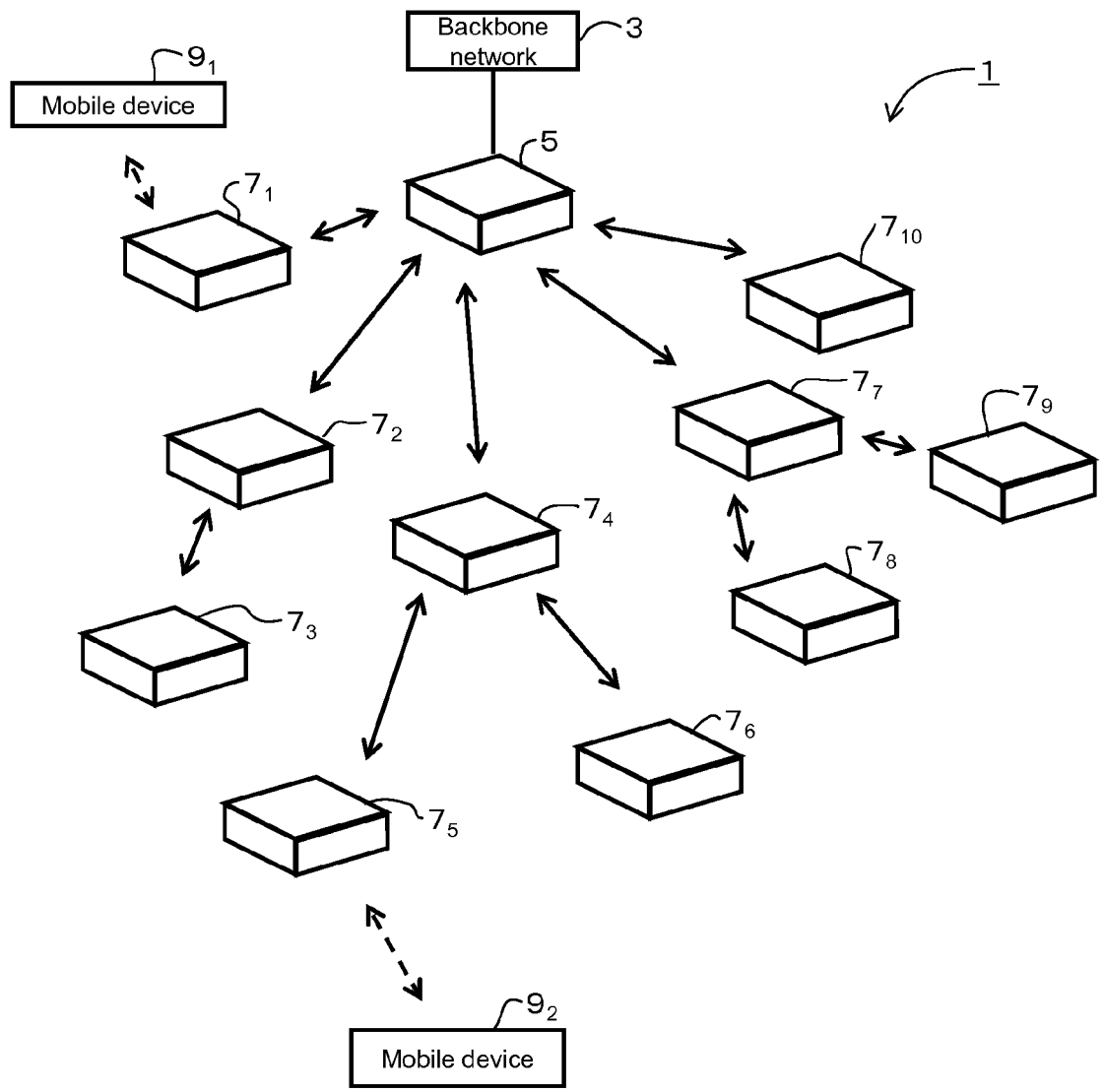
FIG. 1 shows a schematic diagram of a communication system 1 in accordance with an embodiment of the present invention.

FIG. 1 shows a schematic diagram of a communication system 1 in accordance with the embodiment of the present invention. A communication system 1 is a wireless backhaul system in which each base station is fixed. There are two kinds of base stations in the communication system 1. One is a core node 5 (an example of "core node" in CLAIMS) which has a wired connection to backbone network 3. The other is a plurality of slave nodes $7_1, \ldots, 7_{10}$ (an example of "slave node" in CLAIMS.) Wireless communication is available between base stations. The wireless communication line between base stations is referred to as a "relay line" hereafter. In the relay line, as shown in FIG. 1, a tree-type route is made where the core node 5 plays a central role. Each base station has an area where wireless communication is available (cluster cell.) A portable terminal 9 which can move and communicate with base stations like a mobile phone, for example, communicates with a base station if the portable terminal 9 is within the cluster cell of the base station. The wireless communication line between a base station and a portable device and the like is referred to as "access line" hereafter. The portable terminal 9 can connect to the backbone network 3 via an access line and a relay line.

Next, the routing protocol of the present embodiment (referred to as "the present protocol" hereafter) is described regarding to the calculation of an evaluation value of RSSI based on the sequential average of RSSI. The present protocol includes a plurality of rounds. In each round, each relay node transmits and receives routing packets repeatedly with neighbor nodes, calculates the sequential average of RSSI, and make a complete route.

In a propagation channel of a wireless backhaul, RSSI is known to be log-normally distributed in general (refer to Non-Patent Document 2.) That is, RSSI in dB is a probability process whose amplitude is normally-distributed.

The sequential average values $\{A_n, n=1, 2, \ldots\}$ of a series of values $\{R_n, n=1, 2, \ldots\}$ taken as samples of RSSI between nodes evenly at regular intervals are defined by the equation (1). The sequential average series $\{A_n\}$ converge to an average value of the probability process as n increases (refer to Non-Patent Document 3.) Thus, the sequential average values of RSSI between nodes converge to a certain value and the routes made at each round converge asymptotically to a stable route.

[Equation 2]

$$A_n = \begin{cases} R_1, & n = 1 \\ \dfrac{A_{n-1} \times (n-1) + R_n}{n}, & n = 2, 3, \ldots \end{cases} \quad (1)$$

Figure 2:
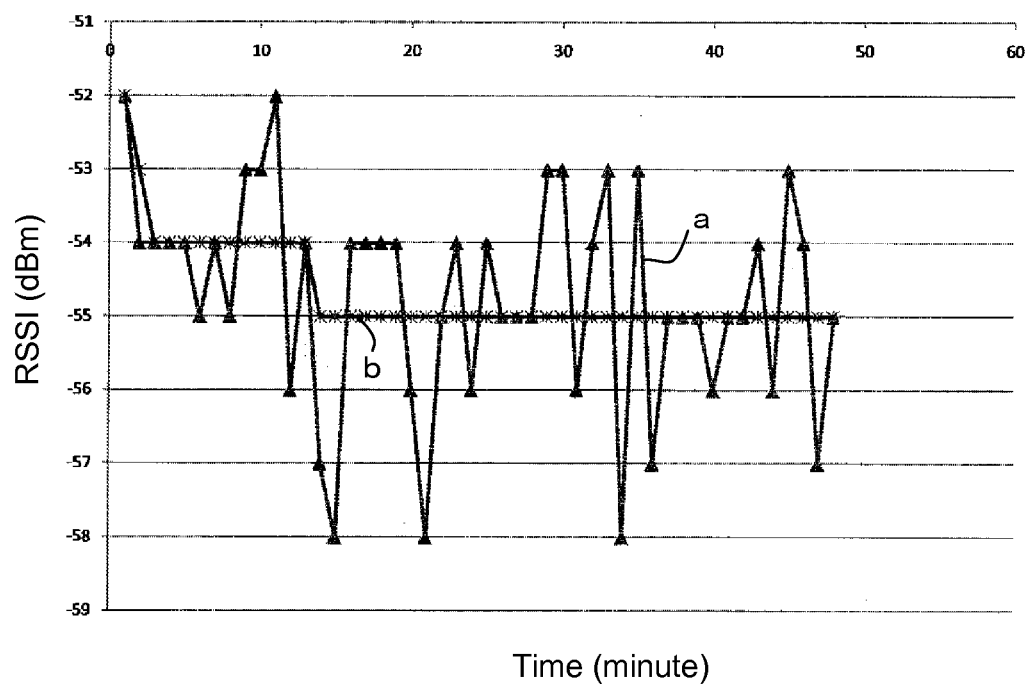
FIG. 2 illustrates a chart showing a temporal change of (a) RSSI and (b) sequential average.

In the relay line of FIG. 1, a propagation channel can fluctuate at the influence of fading occurred by people's traffic and so on. In FIG. 2, the line a plotted by the triangle symbols indicates the temporal change of actually observed RSSI. RSSI fluctuates wildly over time. Thus, the route of relay line goes unstable if the conventional minimum path loss routing method is applied to follow the RSSI fluctuation consistently.

On the other hand, in FIG. 2, the line b plotted by the cross symbols indicates the temporal change of sequential average obtained by the equation (1). The line b in FIG. 2 comes in the range between −52 dBm and −55 dBm and stays in the range. As this, the fluctuation of RSSI can be suppressed after a while by calculating the sequential average of values taken as samples of RSSI between nodes.

Next, referring to FIGS. 3 through 6, an example of the configurations and the behaviors of the core node 5 and the slave nodes $7_i$ (i is a counting number equal to or less than the number of slave nodes) of the present protocol in FIG. 1 is described.

First, the routing packet of the present protocol and routing variables and parameters that each node has are defined.

An "own node metric" (an example of "own route evaluation value" in CLAIMS) is the sum of path losses of each node on the relay route from the node itself to the core node. Each node keeps this own node metric and initializes it with the maximum value at power-on.

The core node 5 transmits a "routing packet" to each slave node $7_i$. There are two kinds of routing packets. One is a reset routing packet (an example of "reset routing packet" in CLAIMS) which the core node 5 transmits to each slave node $7_i$ for instructing the slave node $7_i$ to clear away its existing route information. The other is a normal routing packet (an example of "normal routing packet" in CLAIMS) which the core node 5 transmits to make a route. A routing packet has information of accumulated metric (an example of "accumulated route evaluation value" in CLAIMS) and packetID. Here, the accumulated metric included in a routing packet is the own node metric kept by the node which transmitted the routing packet at the transmission.

A "neighbor node table" is a table storing the addresses of the neighbor nodes, the sequential average of RSSI, and the number of transmissions of routing packets. Here, neighbor nodes means the nodes in the region where the own node can transmits or receives packets.

An "uplink forwarding target" is the address of an uplink forwarding target node (an example of "uplink forwarding target node information" in CLAIMS) kept by each slave node $7_i$ as routing information. In the present protocol, Bellman-Ford algorithm is adopted. Thus, a relay route to be made has a tree structure, and each slave node $7_i$ has only one uplink forwarding target. Therefore, each slave node $7_i$ has the address of its uplink forwarding target node as routing information. Each node can know its downlink forwarding target by checking the address of the transmission source in a uplink forwarded packet during forwarding. So, the downlink forwarding target is not decided at making a route but checked after the route is decided.

An "own node TimeID" is a time stamp included to identify the transmission time of each routing packet.

And the parameters necessary in the present protocol include wait time $T_w$ for clearing routing history in each slave node, the number of executed rounds $N_r$, the clearance time between rounds $T_c$, the wait time $T_r$ of the core node at each round, and the wait time $T_s$ of a slave node.

Figure 3:
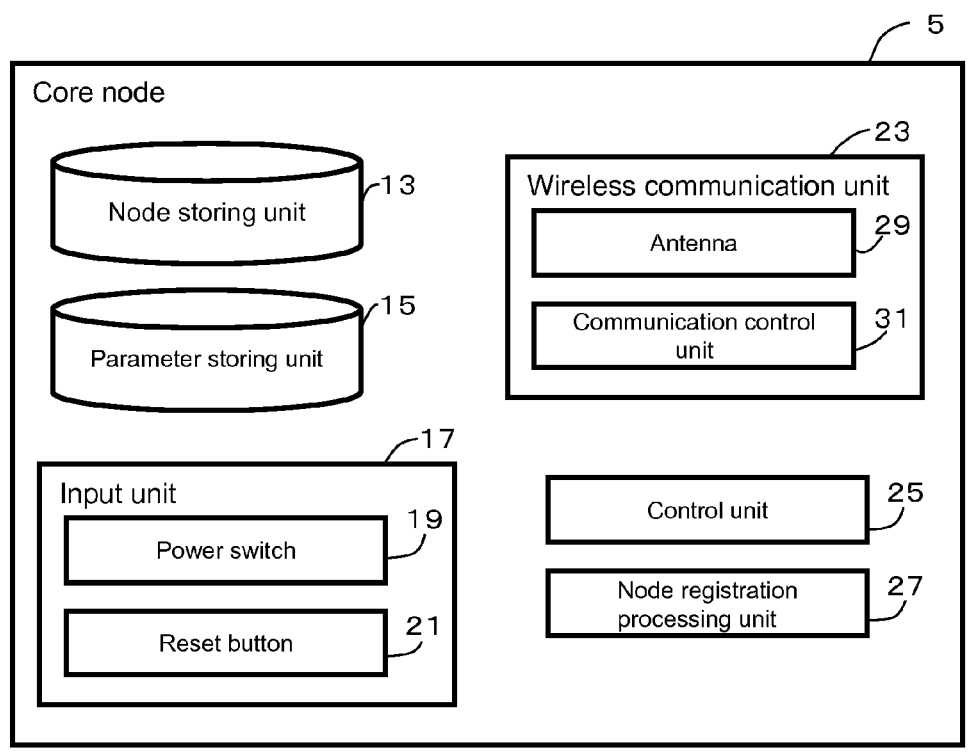
FIG. 3 illustrates a block diagram showing an example of the configuration of the core node 5 in FIG. 1.

First, referring to FIG. 3, an example of the configuration of the core node 5 in FIG. 1 is described.

The core node 5 includes a node storing unit 13 which stores a neighbor node table, a parameter storing unit 15 which stores kinds of parameters, a power switch 17 and a reset button 19 in an input unit 21, a wireless communication unit 23 which communicates with slave nodes $7_i$ by wireless, a control unit 25 which controls the behavior of the core node 5, and a node registration processing unit 27 which updates a neighbor node table of the node storing unit 13. The wireless communication unit 23 has an antenna 29 and a communication control unit 31 which controls the communication by antenna 29. The power switch 19 is operated at power-on of the core node 5. The reset button 21 is operated to instruct the core node externally to make a new relay route when there is a change in the placed nodes. For example, when a part of or all of the places of the core node 5 and the slave nodes $7_i$ are changed, when apart of the slave nodes $7_i$ are deleted from the communication system 1, or when a slave node is newly added.

Figure 4:
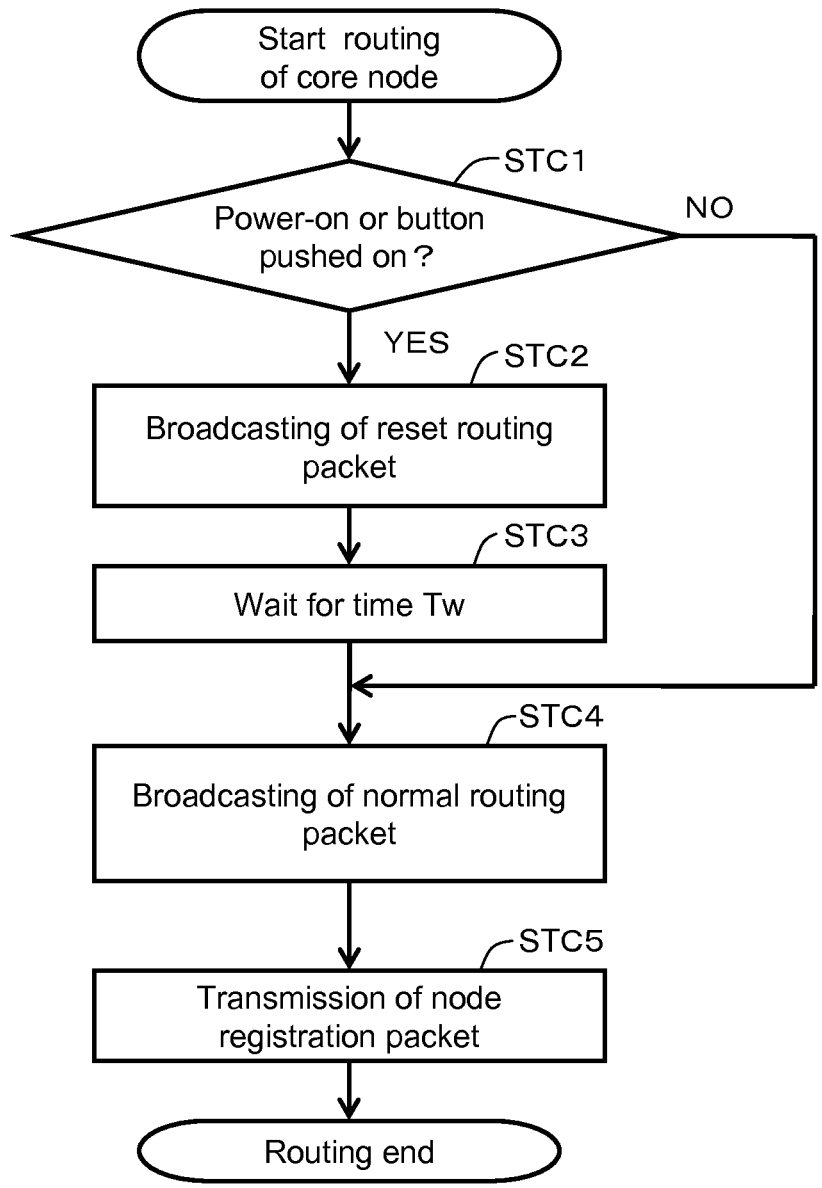
FIG. 4 illustrates a flowchart showing an example of the behavior of the core node 5 in FIG. 3.

Next, referring to FIG. 4, an example of the behavior of the core node 5 in FIG. 1 is described. The process in FIG. 4 is executed when initialization is needed and $N_r$ times at the intervals of $T_c$. In FIG. 4, as an example of the case when initialization is needed, the case when the power switch 19 or the reset button 21 is operated is shown.

The control unit 25 judges if the power is made on or the reset button 21 is pushed on (step STC1.) If operated, in the core node 5, the control unit 25 sets the packetID of a reset routing packet and the own node TimeID of the core node 5 to the time of transmission of the routing packet, controls the communication control unit 31 of the wireless communication unit 23 to transmit the reset routing packet from the antenna 29 to each slave node $7_i$ (step STC2), waits for $T_w$ time (7 seconds, for example) (step STC3), and transmits normal routing packets to each slave node $7_i$ at the interval of $T_c$ (step STC4.) At this time, the accumulated metric of the routing packet is 0, and the packetID is set to the time when the core node transmits broad cast packets. On the other hand, if the power is not made on or the reset button 21 is not pushed on at step STC1, the processing of STC4 is executed. These are included in one round and the core node 5 finishes a round after time $T_r$ from the start of the round. Then, the communication system 1 ends one routing. And, when a node registration packet is received, the node registration processing unit 27 registers the transmission source node of the packet on the neighbor node table of the node storing unit 13 as a neighbor node (step STC5.)

Here, the clearance time $T_c$ may vary the interval, instead of keeping it, based on the number of times, because the relay route is asymptotically converged. In addition, the control unit 25 may broad cast reset routing packets at a predetermined time in order that the relay route is distinguished between weekdays from weekends or days from nights.

Figure 5:
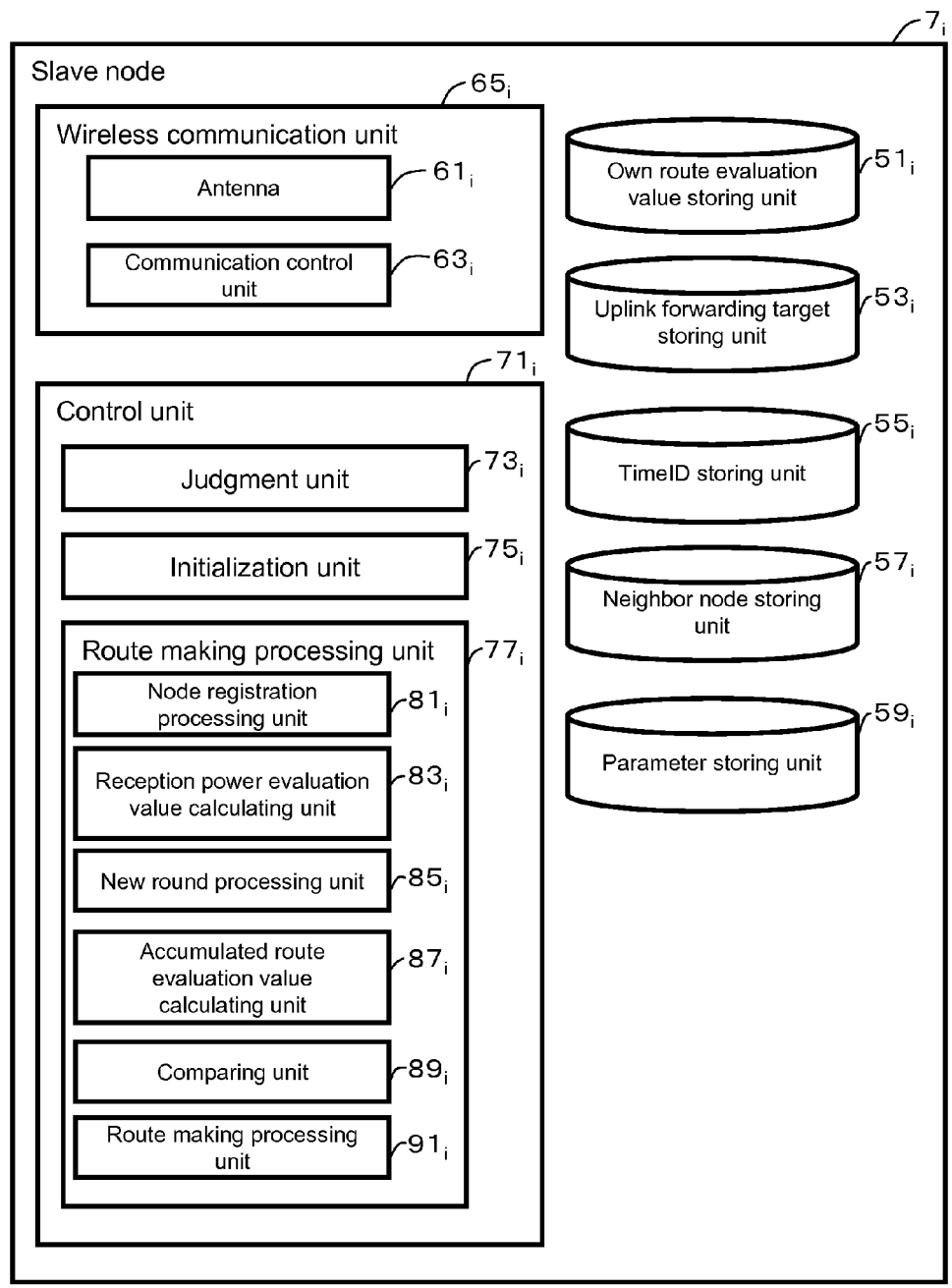
FIG. 5 illustrates a block diagram showing an example of the configuration of the slave node $7_i$ in FIG. 1.
Figure 6:
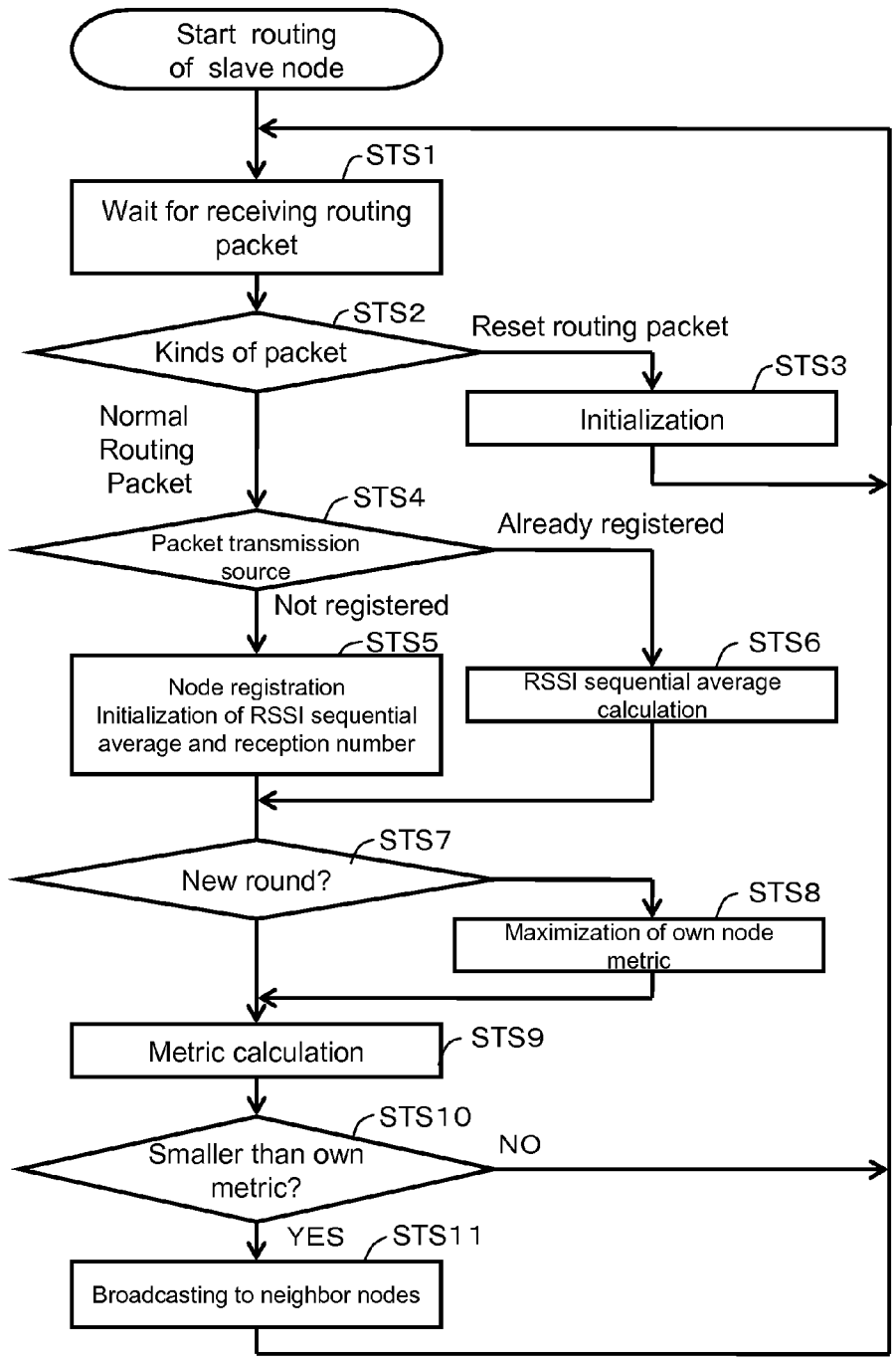
FIG. 6 illustrates a flowchart showing an example of the behavior of the slave node $7_i$ in FIG. 5.

Next, referring to FIGS. 5 and 6, the slave node $7_i$ in FIG. 1 is described.

Referring to FIG. 5, an example of the configuration of the slave node $7_i$ in FIG. 1 is described in the following.

The slave node $7_i$ includes an own route evaluation value storing unit $51_i$ (an example of "own route evaluation value storing unit" in CLAIMS) which stores an own node metric, an uplink forwarding target storing unit $53_i$ (an example of "an uplink forwarding target storing unit" in CLAIMS) which stores the address of an uplink forwarding target node, a TimeID storing unit $55_i$ which stores an own node TimeID, a neighbor node storing unit $57_i$ (an example of "node storing unit" in CLAIMS) which stores a neighbor node table, a parameter storing unit $59_i$ which stores parameters, wireless communication unit $65_i$ which communicates with other nodes by wireless, control unit $71_i$ which controls the behavior of the slave node $7_i$. The wireless communication unit $65_i$ includes an antenna $61_i$ for wireless communication with other nodes and a communication control unit $63_i$ which controls the communication with the antenna $61_i$.

The control unit $71_i$ includes a judgment unit $73_i$ which judges the kinds of received packets, an initialization unit $75_i$ (an example of "an initialization unit" in CLAIMS) which initializes a neighbor node table and so on when a reset routing packet is received, and a route making processing unit $77_i$ (an example of "route making processing unit" in CLAIMS) which executes a route making processing of a relay route from the core node 5 to the slave node $7_i$ itself when a normal routing packet is received.

The route making processing unit $77_i$ includes a node registration processing unit $81_i$ (an example of "node registration processing unit" in CLAIMS) which registers, when the transmission source of a received normal routing packet is not registered on the neighbor node table, the transmission source of the packet, a reception power evaluation value calculating unit $83_i$ (an example of "reception power evaluation value calculating unit" in CLAIMS) which calculates the sequential average $A_n$ (n is a counting number) (an example of "reception power evaluation value" in CLAIMS) of the reception power $R_n$ of the n-th normal routing packet received counting from the reception of a reset routing packet, using the equation (1), a new round processing unit $85_1$ which judge if a new round starts or not, an accumulated route evaluation value calculating unit $87_1$ (an example of "accumulated route evaluation value calculating unit" in CLAIMS) which calculates a path loss from the transmission source node to the own node using the sequential average $A_n$ and calculates a newly obtained metric (referred to as "a new metric" below) by adding the path loss and an accumulated metric included in the received packet, a comparing unit $89_i$ which compares the new metric with an own node metric, a route making processing unit $89_i$ (an example of "route making processing unit" in CLAIMS) which replaces an uplink forwarding target, when the new metric is smaller than the own node metric, by the transmission source of the packet, executes a route making processing with setting the newmetric as a new own node metric, and transmits the new own node metric to each node stored in the neighbor node table.

Here, the accumulated route evaluation value calculating unit $87_1$ calculates the path loss using the equation (2), where TX_POWER is a transmission power whose unit is dBm.

[Equation 3]

$$PassLoss = 10^{\frac{TX\_POWER - RSSI}{10}}. \quad (2)$$

Next, referring to FIG. 6, the behavior of the slave node $7_i$ in FIG. 5 will be described.

The slave node $7_i$ waits for the reception of a routing packet (step STS1), and when receiving, the judgment unit $73_i$ judges the kinds of the received routing packet (step STS2.) If it is a reset routing packet, the initialization unit checks the packet ID of the received packet. If it is newer than the own Time ID, the initialization unit broadcasts the same reset routing packet to neighbor nodes, clear the neighbor node table, set the own node metric to a maximum value and set the own node TimeID to the packet ID of the received packet (step STS3.)

If a normal routing packet is received, the node registration processing unit $81_i$ checks the transmission source node and checks if the transmission source node is registered on the neighbor node table (step STS4.) If not registered, the node registration processing unit $81_i$ registers the transmission source node on the neighbor node table. Then, the RSSI of the time of reception is set as an initial value of a sequential average and the number of reception is set to 1 (step STS5.)

If the transmission source node of the normal routing packet is already registered on the table, the reception power evaluation value calculating unit $83_i$ obtains a new sequential average $A_n$ from the equation (1) using the present sequential average and the reception power $R_n$ relating to the transmission source node, replaces the sequential average of the node on the table by the calculated value, and increment the number of reception (STS6.)

Next, the new round processing unit $85_i$ checks the packetID of the received packet, if the packetID is newer than the own node TimeID, judges that a new round starts (step STS7), and sets the own node TimeID to the Packet ID of the received packet (step STS8.) If the packet ID is not newer, the procedure goes to step STS9.

Next, the accumulated route evaluation value calculating unit $87_i$ calculates a path loss from the transmission source node to the own node using the sequential average of RSSI and obtains a new metric by adding the path loss and an accumulated metric included in the received packet (step STS9.)

Next, the comparing unit $87_i$ compares the new metric with the own node metric (step STS10.) If the new metric is smaller than the own node metric, the route making processing unit $89_i$ replaces the own node metric by the new metric and replaces an uplink forwarding target by the address of the transmission source node of the received packet. Then, new routing packets whose accumulated metric is a new metric are broadcasted (step STS11.) If the new metric is not smaller than the own node metric, the procedure goes back to step STS1.

The slave node $7_i$ finishes a round when time Ts is passed after the round starts.

Next, the routing method using the sequential average of RSSI between nodes was implemented in a testbed to evaluate its performance in the actual field. As a testbed, Picomesh LunchBox (referred to as "LB" below) which is resulted from the development project of "MIMO-MESH point" in the knowledge cluster initiative program in the second stage, supported by the Ministry of Education, Culture, Sports, Science & Technology in Japan and promoted by the present inventors, was utilized as the testbed.

LB is equipped with three systems of generalized wireless LAN modules being compliant with 802.11b/g/a, two for relay lines and one for an access line. Different frequency channels are assigned to each wireless module, thereby avoiding the interference between the access line and the relay line.

Figure 7:
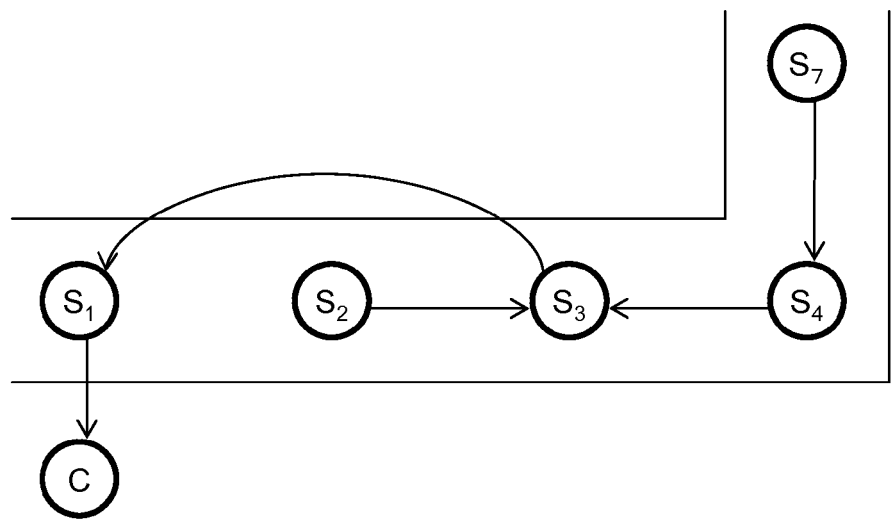
FIG. 7 illustrates a stable route made by the experiment in the embodiment of the present invention.
Figure 8:
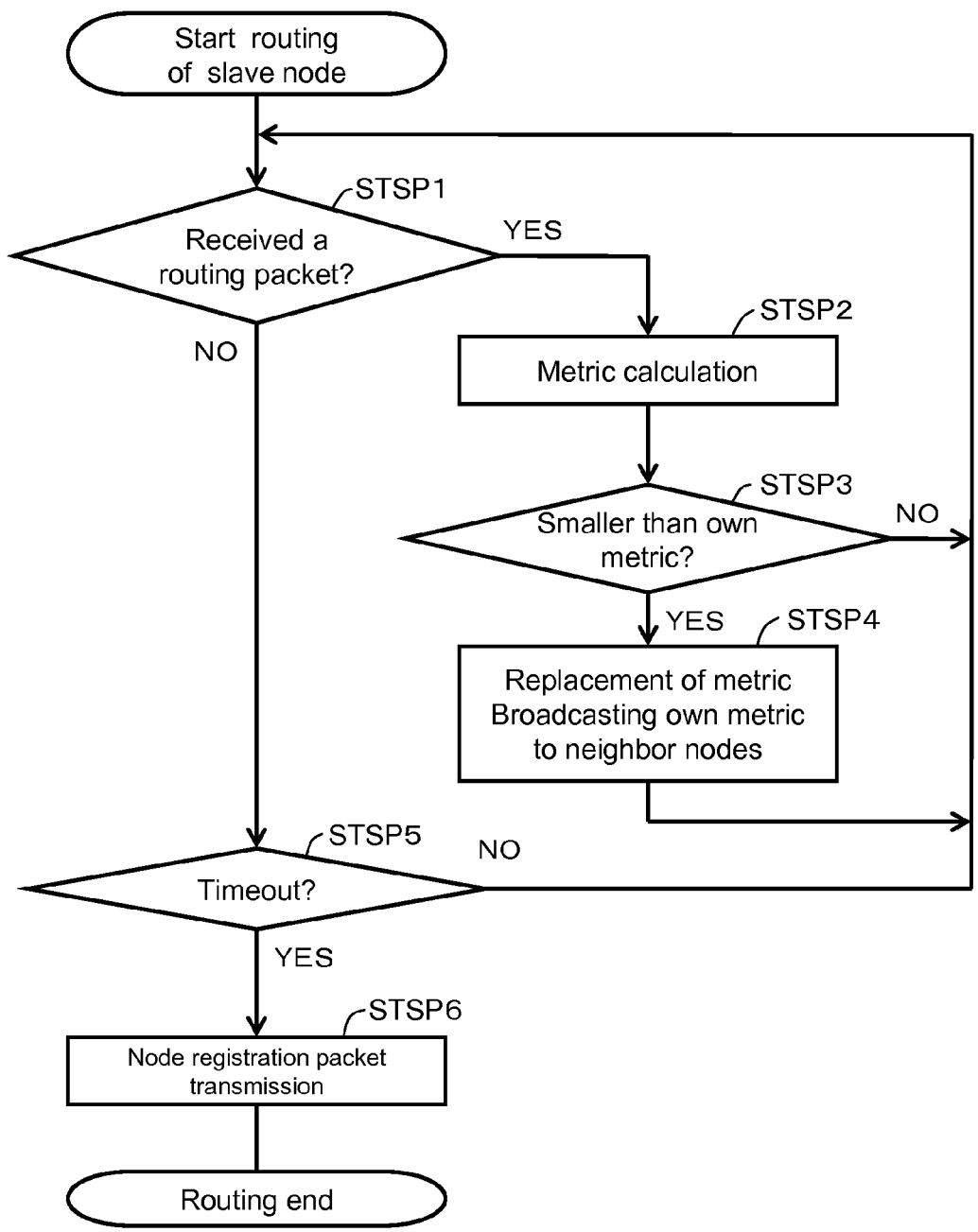
FIG. 8 illustrates a flowchart showing the behavior of the slave node in a conventional minimum path loss routing method.

As shown in FIG. 7, a communication system is established by a core node C and five slave nodes $S_1$ through $S_5$. The parameters of the protocol in the experiment are set such that the wait time $T_r$ of the core node at each round is 2 seconds, the wait time $T_s$ of the slave nodes at each round is 2 seconds, the reset wait time $T_w$ of the slave nodes is 5 seconds, the interval $T_c$ at each round is 3 minutes, and the number of round $N_r$ is 100 times.

The experimental results are shown in Table 1, where the relay route patterns appeared when the conventional minimum path loss routing is adopted and the routing of total 100 times at 3 minute intervals are executed, and the relay route patterns appeared when the routing protocol of the present embodiment similarly of total 100 times at 3 minute intervals are executed are shown.

In the case of the conventional routing method, 8 different patterns of relay routes were established depending on the time of day. The patterns depend on the situation of propagation channel at routings, resulting in an instable system. On the other hand, in the case of the protocol of the present embodiment, Route1 shown in FIG. 7 was fixed from the second or the third round. Therefore, the present embodiment indicates that the relay route was stably established even in the actual environment where the propagation channel fluctuates over time.

TABLE 1

| Relay Route Pattern | conventional method | Present Embodiment |
|---|---|---|
| Route1 | 35% | 100% |
| Route2 | 20% | 0% |
| Route3 | 10% | 0% |
| Route4 | 5% | 0% |
| Route5 | 15% | 0% |
| Route6 | 5% | 0% |
| Route7 | 5% | 0% |
| Route8 | 5% | 0% |

The communication system can be easily extended to a system which has two or more core nodes, though the communication system which has only one core node is described in the present embodiment. When there are two or more core nodes, the routing packets are transmitted from each core node. Thus, for example, the core node 5 sets the own node TimeID to zero at initialization. When the core node 5 receives a reset routing packet, it checks the packetID, and if the packetID is newer than its own node TimeID, the same reset routing packet is broadcasted, and replaces its own node TimeID by the packetID of the received packet. Then, after time $T_w$, the core node broadcasts a normal routing packet to neighbor nodes at intervals of $T_c$, until the number of transmission reaches $N_r$. Such an operation can realize a system with a plurality of core nodes.

In addition, the calculation of the reception power evaluation value by the reception power evaluation value unit $83_i$ in the present invention is not restricted to the present embodiment. For example, as expressed by the equation (3), it may be calculated by obtaining the sequential average of the reception power of a routing packet using the reception power $R_0$ of a reset routing packet as the initial value $A_0$ of a reception power evaluation value to and the reception power evaluation value $A_n$ (n is a counting number) of an n-th normal routing packet received. In this case, in the step STS3 of FIG. 6, when the initialization unit $75_i$ initializes the neighbor node storing unit $57_i$, the initialization unit $75_i$ may make the neighbor node storing unit $57_i$ store the combination of the transmission source node of a reset routing packet and the initial value of a reception power evaluation value and may calculate the sequential average. As this, the reception power evaluation value may be calculated using the reception power of a reset routing packet. More generally, the reception power evaluation value may be calculated using not only the reception power of the received normal routing packet but also the reception power of a reset routing packet and/or a part of or all of the reception power of other normal routing packets. In particular, the reception power evaluation value $A_n$ (n is a counting number equal to or more than 2) which is the evaluation value of the reception power $R_n$ of an n-th normal routing packet received may be calculated using the equation (4). In this case, for n=1, $A_1=R_1$, for example, can be adopted. Further, $A_1$ may be calculated by assuming that $A_0$ is the reception power $R_0$ of a reset routing power and by adding $R_0$ and $R_1$ which are multiplied by a constant, respectively, like expressed by the equation (4).

Further, in the equation (4), at least one of $\alpha_n$ and $\beta_n$ may be a constant. Then, the fluctuation of RSSI can be suppressed.

Further, in FIG. 6, the processing of step STS9 may be executed before the processing of steps STS7 and STS8.

[Equation 4]

$$A_n = \frac{n \times A_{n-1} + R_n}{n+1}. \text{ Here, } A_0 = R_0. \quad (3)$$

$$A_n = \alpha_n \times A_{n-1} + \beta_n \times R_n. \quad (4)$$

PRIOR ART DOCUMENTS

Patent Document

[Patent Document 1]: Japanese Patent No. 3928636
[Patent Document 2]: Japanese Patent No. 4227737
[Patent Document 2]: Japanese Patent No. 4389929

Non-Patent Documents

[Non-Patent Document 1]: Ebata and Furukawa "A study on Number of Directional Antennas and Required Bandwidth for Wireless Base Node Repeater Network", IEICE, RCS2001-94, July 2001.
[Non-Patent Document 2]: Andrea Goldsmith, "Wireless Communications."
[Non-Patent Document 3]: B. P. Lathi, "Modern Digital and Analog Communication system."

DESCRIPTION OF SYMBOLS 1 communication system, 3 backbone network, 5 core node, $7_i$ slave node, $51_i$ own route evaluation value storing unit, $53_i$ uplink forwarding target storing unit, $75_i$ initialization unit, $81_i$ node registration processing unit, $83_i$ reception power evaluation value calculating unit, $87_i$ accumulated route evaluation value calculating unit, $91_i$ route making processing unit

The invention claimed is:

1. A communication system, comprising:
a core node that connects to a backbone network; and
a plurality of slave nodes that connect to the core node with wireless communication directly or via another slave node,
wherein the core node transmits, to one of the slave nodes, a reset routing packet for instructing the slave node to initialize a communication route from the core node to the slave node itself, and afterwards, a plurality of normal routing packets for instructing the slave node to construct a communication route from the core node to the slave node itself;
the slave node includes:
  an own route evaluation value storing unit that stores an own route evaluation value which is an evaluation value of a communication route from the core node to the slave node itself;
  an uplink forwarding target storing unit that stores an uplink forwarding target information which shows an uplink forwarding target node which is a first node on a communication route from the slave node itself to the core node; and
  a route making processing unit that decides a communication route from the core node to the slave node itself, when receiving the reset routing packet and n (n is a counting number) of the normal routing packets from a single transmission source node, after judging whether to replace the uplink forwarding target node by the transmission source node;
the route making processing unit includes:
  a reception power evaluation value calculating unit that calculates a reception power evaluation value which is an evaluation value of reception power between the slave node itself and the transmission source node, based on reception power of an n-th normal routing packet received;
  a new accumulated route evaluation value calculating unit that calculates a new accumulated route evaluation value which is an evaluation value of a communication route that the n-th normal routing packet received has gone through, based on an evaluation value of a relay route from the core node to the transmission source node and on the reception power evaluation value; and
  a route making processing unit that, if the new accumulated route evaluation value is smaller than the own route evaluation value, makes the uplink forwarding target storing unit store a transmission source node of the normal routing packet as a new uplink forwarding target node, and makes the own route evaluation value storing unit store the accumulated route evaluation value as a new own route evaluation value for a route making processing; and
the reception power evaluation unit, if n equals to or is larger than two, calculates a reception power evaluation value which is an evaluation value of a reception power between the slave node itself and the transmission source node, based not only on a reception power of the n-th normal routing packet received but also on a part of or all of reception power of the reset routing packet and/or the normal routing packet separately received.

2. The communication system of claim 1,
wherein the reception power evaluation value calculating unit calculates a reception power evaluation value $A_n$ which is an evaluation value of a reception power $R_n$ of the n-th normal routing packet received, setting a default value a constant or a reception power of the reset routing packet, based on an equation (eq1) with $\alpha_n$ and $\beta_n$ ($\alpha_n$ and $\beta_n$ are functions of n, $\alpha_n$ is not identically 0), and
[Equation 1]

$$A_n = \alpha_n \times A_{n-1} + \beta_n \times R_n. \quad (eq1)$$

3. The communication system of claim 2,
wherein in the equation (eq1),
$A_1 = R_1$; and
if n equals to or is larger than two, $\alpha_n = (n-1)/n$ and $\beta_n = 1/n$.

4. The communication system of claim 2,
wherein in the equation (eq1), $\alpha_n$ and/or $\beta_n$ is a constant.

5. A slave node that connects to a core node with wireless communication directly or via another slave node, comprising:
an own route evaluation value storing unit that stores an own route evaluation value which is an evaluation value of a communication route from the core node to the slave node itself;
an uplink forwarding target storing unit that stores an uplink forwarding target information which shows an uplink forwarding target node which is a first node on a communication route from the slave node itself to the core node; and
a route making processing unit that decides a communication route from the core node to the slave node itself, when receiving a reset routing packet for instructing the slave node to initialize a communication route from the core node to the slave node itself, from the core node, and n (n is a counting number) of normal routing packets for instructing the slave node to construct a communication route from the core node to the slave node itself, from a single transmission source node, after judging whether to replace the uplink forwarding target node by the transmission source node, wherein the route making processing unit includes:

a reception power evaluation value calculating unit that calculates a reception power evaluation value $A_n$ which is an evaluation value of a reception power $R_n$ of an n-th normal routing packet received, by calculating a sequential average of a reception power of the reset routing packet and n of received normal routing packets or by calculating a sequential average of received normal routing packets;

a new accumulated route evaluation value calculating unit that calculates a new accumulated route evaluation value which is an evaluation value of a communication route that the n-th normal routing packet received has gone through, based on an evaluation value of a relay route from the core node to the transmission source node and on the reception power evaluation value; and a route making processing unit that, if the new accumulated route evaluation value is smaller than the own route evaluation value, makes the uplink forwarding target storing unit store a transmission source node of the normal routing packet as a new uplink forwarding target node, and makes the own route evaluation value storing unit store the accumulated route evaluation value as a new own route evaluation value for a route making processing.

6. A route making method for a communication system including a core node that connects to a backbone network and a plurality of slave nodes that connect to the core node with wireless communication directly or via another slave node, wherein each of the slave nodes includes:

an own route evaluation value storing unit that stores an own route evaluation value which is an evaluation value of a communication route from the core node to the slave node itself;

an uplink forwarding target storing unit that stores an uplink forwarding target information which shows an uplink forwarding target node which is a first node on a communication route from the slave node itself to the core node; and a neighbor node storing unit that stores a combination of a node which is capable of transmit or receive a packet with the slave node itself and a reception power evaluation value which is an evaluation value of a reception power of packet transmission with the node;

the method comprising:

initializing including transmitting, by the core node, a reset routing packet for instructing the slave node to initialize a communication route from the core node to the slave node itself, and, by an initialization unit of the slave node which received the reset routing packet, judging whether the slave node has received the reset routing packet for the first time, and if received for the first time, transmitting the same reset routing packet to nodes stored in the neighbor node storing unit, deleting information stored in the neighbor node storing unit, and setting the own route evaluation value a maximum value; and route making including:

transmitting, by the core node, a plurality of normal routing packets for instructing the slave node to construct a communication route from the core node to the slave node itself with their transmission order specified;

and by a reception power evaluation value calculating unit in the slave node which received the normal routing packet, if a transmission source node of the received normal routing packet is not stored in the neighbor node storing unit, calculating a reception power evaluation value which is an evaluation value of a reception power between the slave node itself and the transmission source node based on a reception power of the normal routing packet and making the neighbor node storing unit store a combination of the transmission source node and the reception power evaluation value;

if a transmission source node of the received normal routing packet is stored in the neighbor node storing unit, calculating a new reception power evaluation value not only based on a reception power of the normal routing packet but also on the reception power evaluation value stored in the neighbor node storing unit, and making the neighbor node storing unit store a combination of the transmission source node and a new reception power evaluation value;

judging, by a new round processing unit, whether the received normal routing packet is the normal routing packet received for the first time or not based on the transmission order, and setting the new own route evaluation value a maximum value if received for the first time;

calculating, by a new accumulated route evaluation value calculating unit, a new accumulated route evaluation value which is an evaluation value of a communication route that the normal routing packet has gone through, based on an evaluation value of a relay route from the core node to the transmission source node and on the reception power evaluation value; and if the new accumulated route evaluation value is smaller than the own route evaluation value, making, by a route making processing unit, the uplink forwarding target storing unit store a transmission source node of the normal routing packet as a new uplink forwarding target node, making the own route evaluation value storing unit store the accumulated route evaluation value as a new own route evaluation value for a route making processing, and deciding a communication route from the core node to the slave node itself by transmitting a new own route evaluation value to a node stored in the neighbor node storing unit.

7. A program capable of causing a computer to function as a slave node of claim 5.

* * * * *